US012737899B2

(12) United States Patent
Lee

(10) Patent No.: US 12,737,899 B2
(45) Date of Patent: Sep. 15, 2026

(54) CAMERA DEVICE OF GENERATING A DEPTH MAP OF AN OBJECT

(71) Applicant: LG INNOTEK CO., LTD., Seoul (KR)

(72) Inventor: Gi Seok Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 280 days.

(21) Appl. No.: 18/288,259

(22) PCT Filed: Apr. 28, 2022

(86) PCT No.: PCT/KR2022/006108

§ 371 (c)(1),
(2) Date: Oct. 25, 2023

(87) PCT Pub. No.: WO2022/231349

PCT Pub. Date: Nov. 3, 2022

(65) Prior Publication Data

US 2024/0221195 A1 Jul. 4, 2024

(30) Foreign Application Priority Data

Apr. 28, 2021 (KR) ........................ 10-2021-0054995

(51) Int. Cl.
*G06T 7/50* (2017.01)
*G02B 5/30* (2006.01)
(Continued)

(52) U.S. Cl.
CPC .............. *G06T 7/50* (2017.01); *G02B 5/3025* (2013.01); *G06V 10/25* (2022.01); *H04N 23/55* (2023.01); *H04N 23/56* (2023.01)

(58) Field of Classification Search
None
See application file for complete search history.

(56) References Cited

FOREIGN PATENT DOCUMENTS

CN 111678457 A * 9/2020 ............. G01B 11/22
KR 10-2018-0023785 3/2018
(Continued)

OTHER PUBLICATIONS

English translation of WO-2021174682-A1. (Year: 2021).*
(Continued)

*Primary Examiner* — Thomas D Lee
(74) *Attorney, Agent, or Firm* — KED & ASSOCIATES, LLP

(57) ABSTRACT

A camera device according to an embodiment of the present invention includes a light output unit which generates an output light signal and emits the output light signal to an object, a light receiving unit which receives an input light signal which is reflected from the object and then input to the light receiving unit, a depth information generation unit which generates a depth map of the object using the input light signal input to the light receiving unit, and a control unit which controls the light output unit, the light receiving unit, and the depth information generation unit, wherein the light output unit includes a light source for generating the output light signal, and the control unit controls a current applied to the light source on the basis of information about the object.

20 Claims, 8 Drawing Sheets

(51) Int. Cl.

| | |
|---|---|
| ***G06V 10/25*** | (2022.01) |
| ***H04N 23/55*** | (2023.01) |
| ***H04N 23/56*** | (2023.01) |

(56) References Cited

FOREIGN PATENT DOCUMENTS

| | | | | |
|---|---|---|---|---|
| KR | 10-2020-0005858 | | 1/2020 | |
| KR | 20200005858 A | * | 1/2020 | ............... H01S 5/06 |
| KR | 10-2020-0036614 | | 4/2020 | |
| KR | 10-2020-0049152 | | 5/2020 | |
| KR | 10-2020-0085800 | | 7/2020 | |
| WO | WO-2021174682 A1 | * | 9/2021 | ............... B07C 5/10 |

OTHER PUBLICATIONS

English translation of CN-111678457-A. (Year: 2020).*
English translation of KR-20200005858-A. (Year: 2020).*
International Search Report dated Aug. 4, 2022 issued in Application No. PCT/KR2022/006108.

* cited by examiner

[FIG. 1]
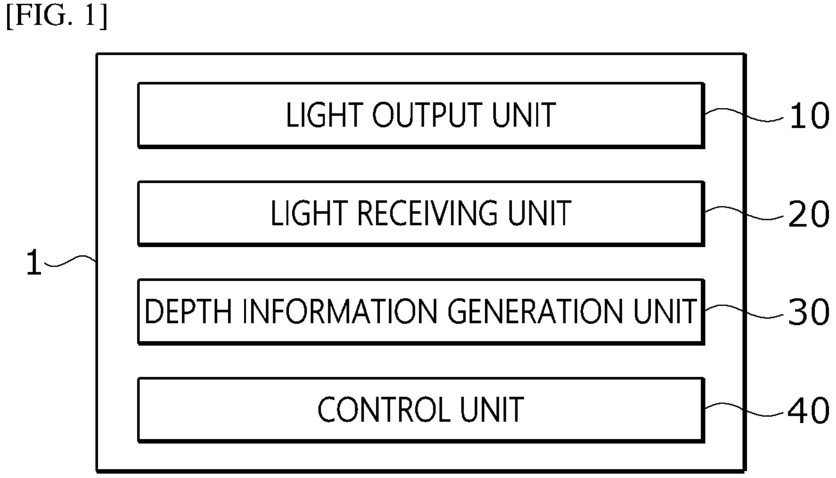
[FIG. 2]
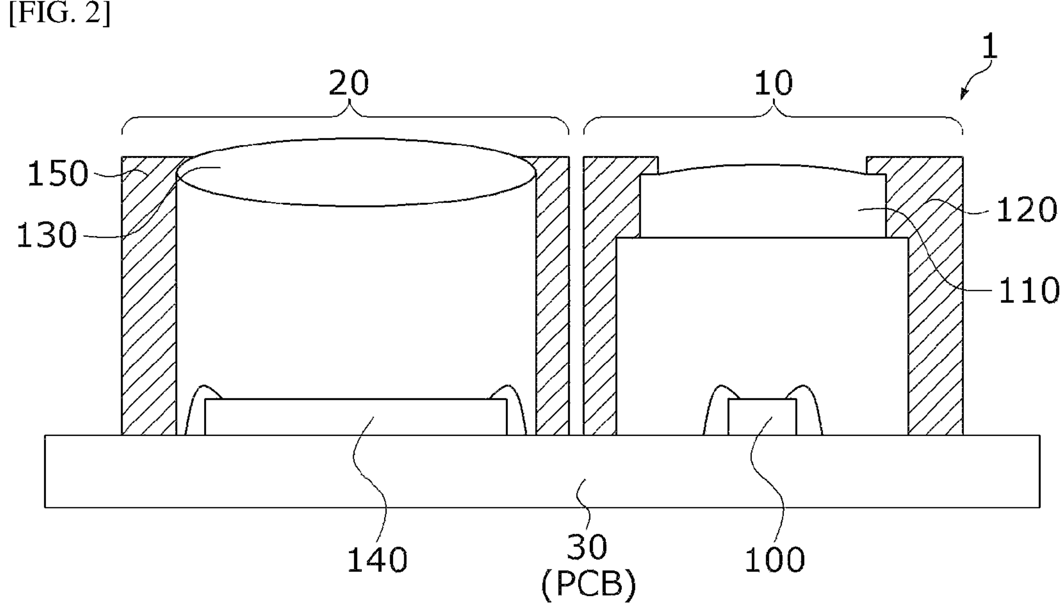

[FIG. 3]
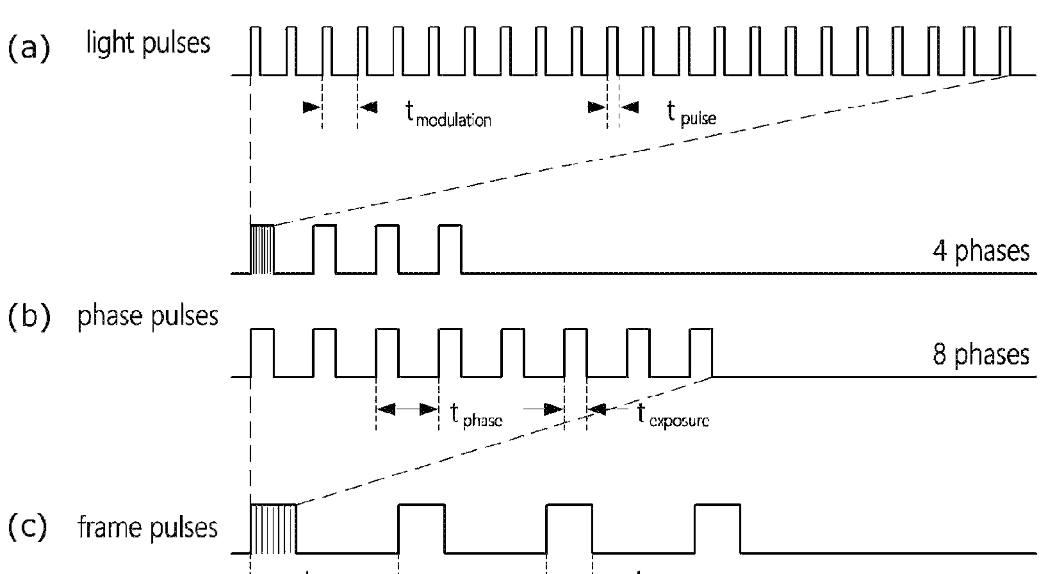
[FIG. 4]
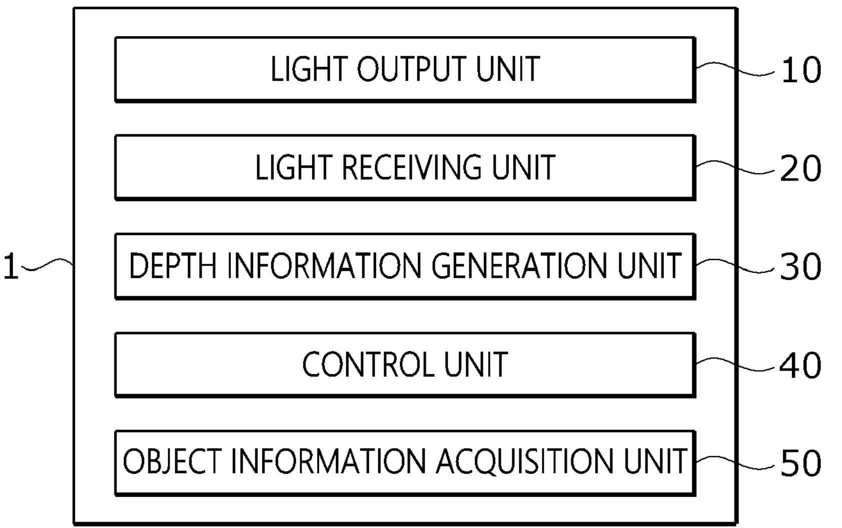

[FIG. 5]
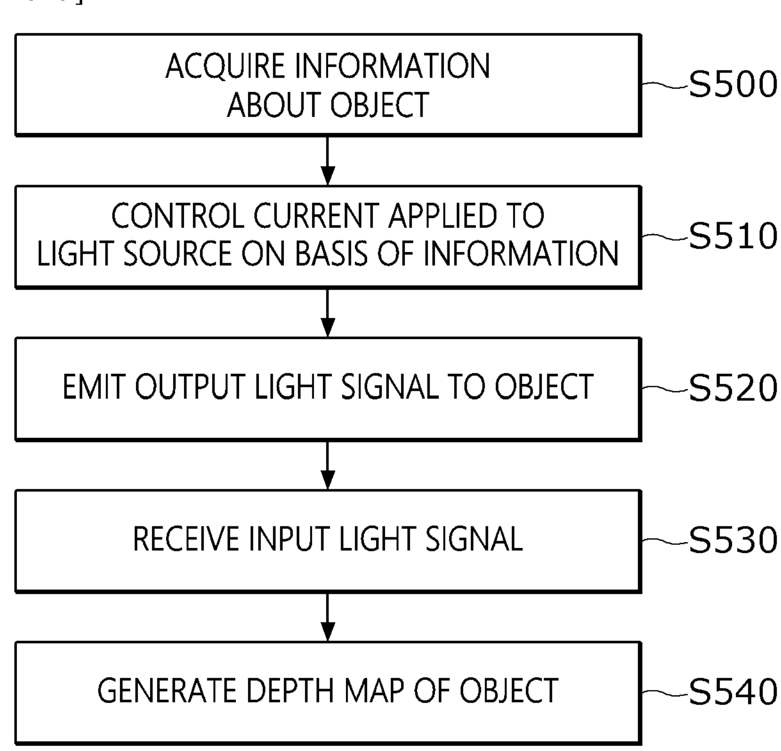

[FIG. 6]
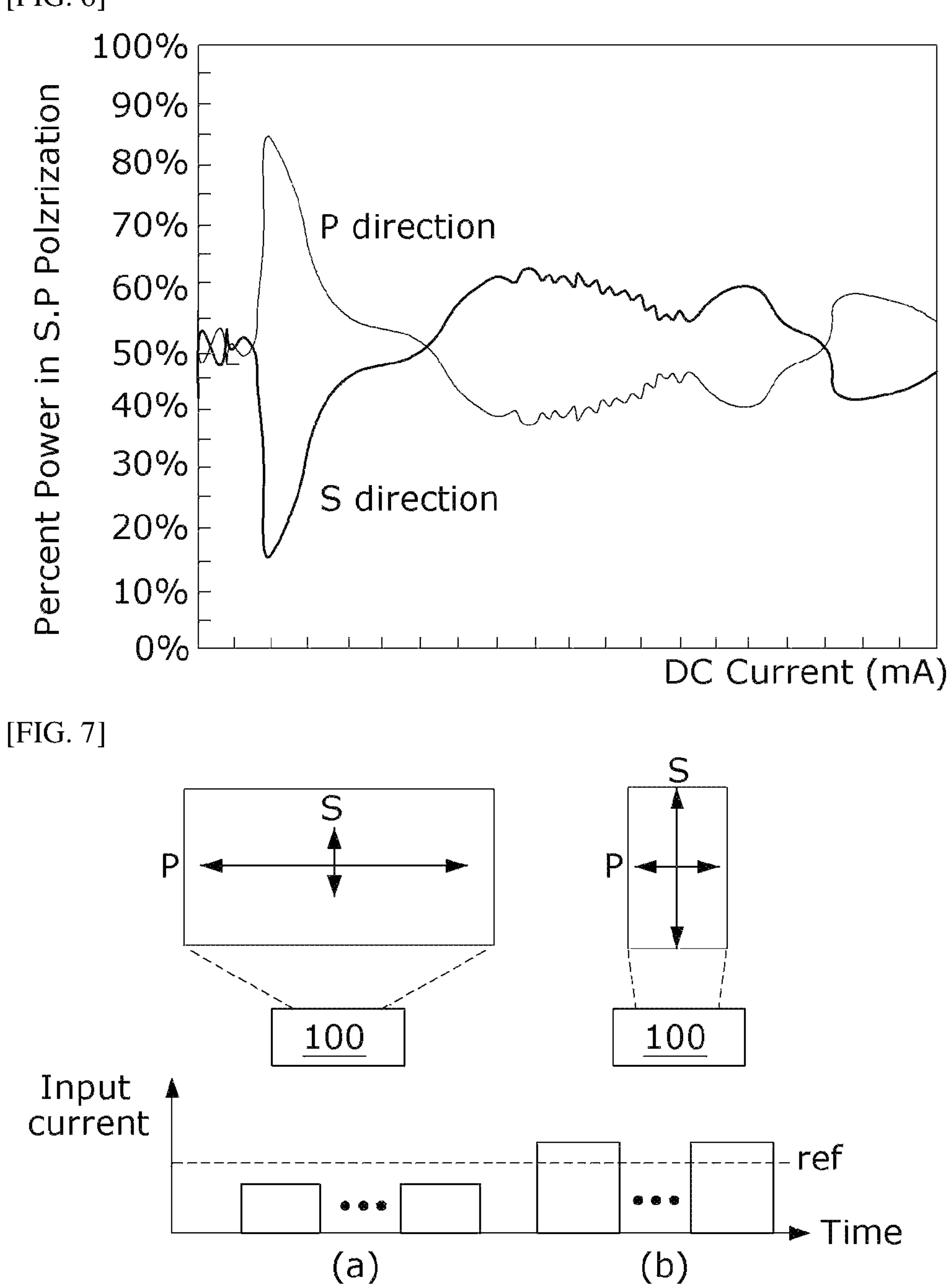

[FIG. 8]

P-POLARIZED COMPONENT
S-POLARIZED COMPONENT
PULSE SHAPE

Intensty
Time
Input current
Time
(a)
(b)
(c)
(d)

[FIG. 9]
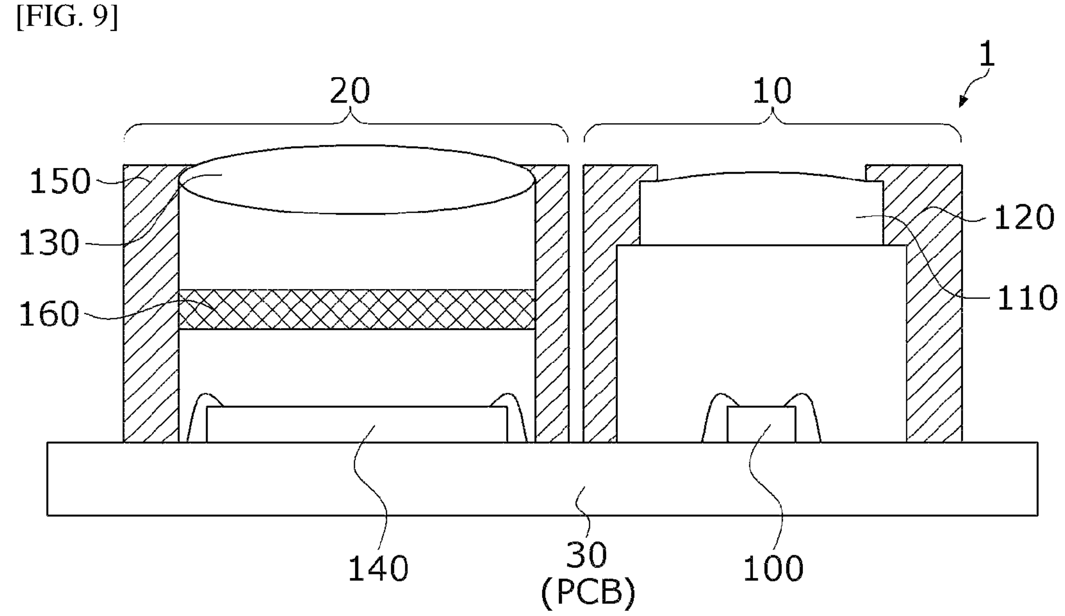

[FIG. 10]
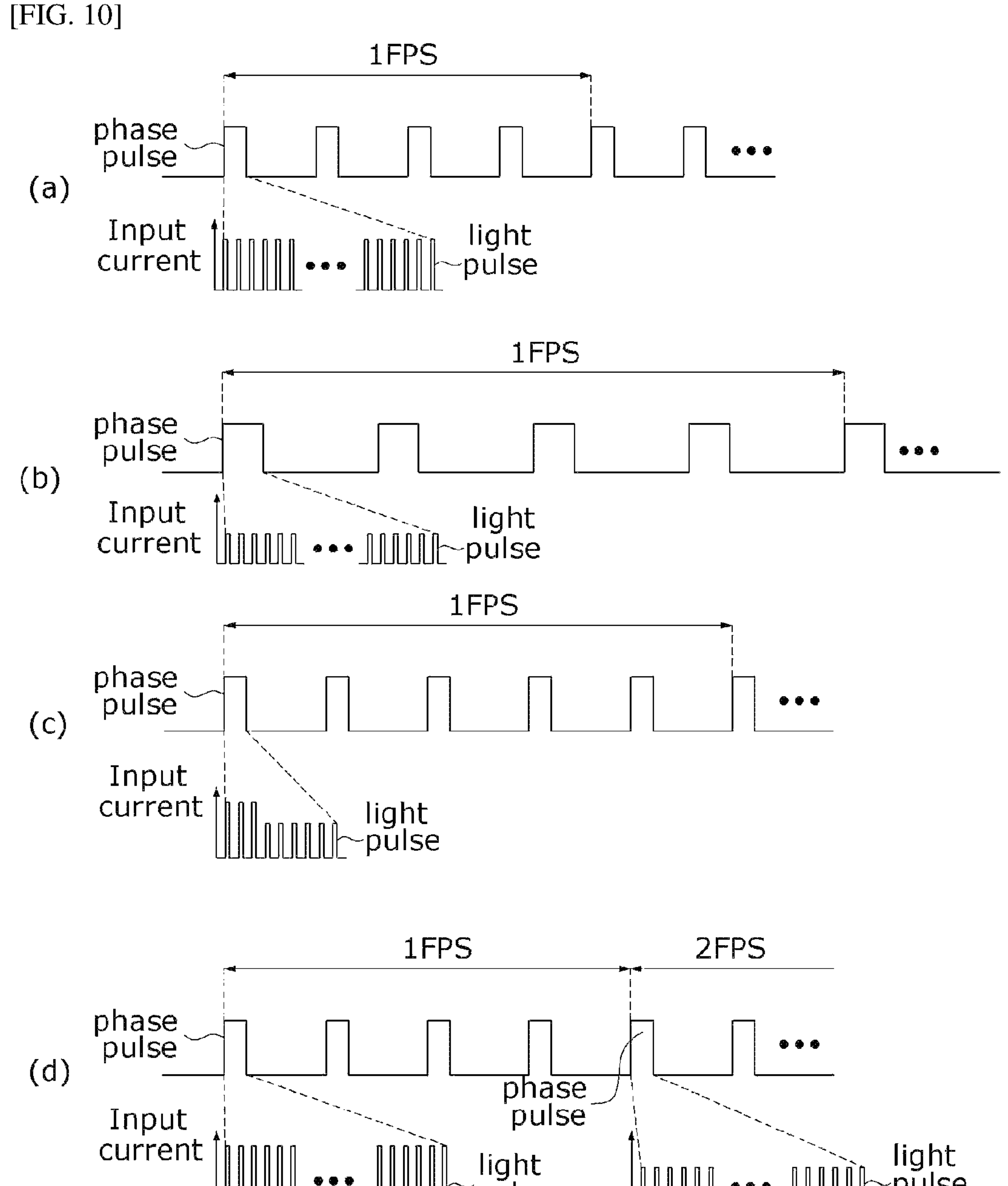

[FIG. 11]
(a)
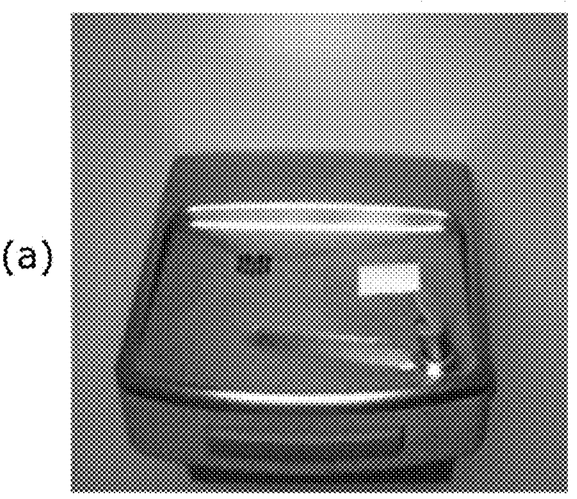
(b)
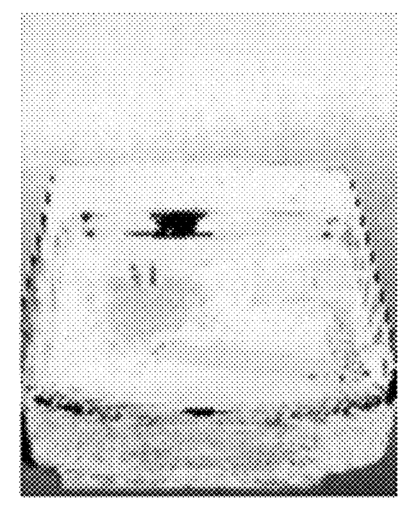
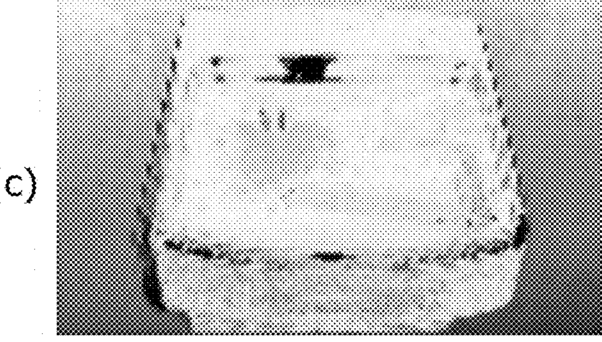

CAMERA DEVICE OF GENERATING A DEPTH MAP OF AN OBJECT

CROSS-REFERENCE TO RELATED PATENT APPLICATIONS

This application is a U.S. National Stage Application under 35 U.S.C. § 371 of PCT Application No. PCT/KR2022/006108, filed Apr. 28, 2022, which claims priority to Korean Patent Application No. 10-2021-0054995, filed Apr. 28, 2021, whose entire disclosures are hereby incorporated by reference.

TECHNICAL FIELD

The present invention relates to a camera device.

BACKGROUND ART

Three-dimensional content is used in various fields such as education, manufacturing, autonomous driving, and the like in addition to the fields of games and culture, and in order to acquire three-dimensional content, a depth map is required. A depth map is information indicating a spatial distance and indicates perspective information from one point to another point in a two-dimensional image. As a technology for acquiring the depth map, a method of projecting infrared (IR) structured light onto an object, a method using a stereo camera, a time of flight (ToF) method, or the like is used.

According to the ToF method, a flying time, that is, a time in which light is emitted, reflected, and returned is measured to calculate a distance to an object. A big advantage of the ToF method is to quickly provide distance information in a three-dimensional space in real time. In addition, a user can acquire accurate distance information without applying an additional algorithm or correction hardware-wise. In addition, even when a very close subject or a moving subject is measured, an accurate depth map can be acquired.

Meanwhile, a reflectivity of light may be changed according to a surface material of the object, and accordingly, an accuracy of a depth map acquired through the ToF method can be changed.

Technical Problem

The present invention is directed to providing a camera device capable of extracting a depth map with high accuracy.

The present invention is directed to providing a camera device capable of selectively extracting a depth map of a specific region within a field of view.

Technical Solution

One aspect of the present invention provides a camera device including a light output unit which generates an output light signal and emits the output light signal to an object, a light receiving unit which receives an input light signal which is reflected from the object and then input to the light receiving unit, a depth information generation unit which generates a depth map of the object using the input light signal input to the light receiving unit, and a control unit which controls the light output unit, the light receiving unit, and the depth information generation unit, wherein the light output unit includes a light source for generating the output light signal, and the control unit controls a current applied to the light source on the basis of information about the object.

The information about the object may include at least one among a surface material of the object, an area of the object, and a shape of the object.

The control unit may control a current smaller than a reference current to be applied to the light source when a horizontal length is greater than a vertical length of the object, and the control unit may control a current greater than the reference current to be applied to the light source when the vertical length is greater than the horizontal length of the object.

The light output unit may further include a lens assembly for diffusing the output light signal output from the light source.

The light receiving unit may include a polarization member which selectively transmits an input light signal having a predetermined polarization angle of the input light signal and an image sensor for receiving the input light signal passing through the polarization member.

At least one of a polarization characteristic and a waveform of the output light signal output by the light source may be changed according to the current.

The light source may include a vertical cavity surface emitting laser (VCSEL).

The depth information generation unit may generate a depth map using a phase difference between the output light signal and the input light signal.

The control unit may control so that a section in which a first current is applied to the light source and a section in which a second current greater than the first current is applied to the light source are alternately repeated.

Another aspect of the present invention provides a method of generating a depth map of a camera device, the method including acquiring information about an object, controlling a current applied to a light source on the basis of the information, generating an output light signal on the basis of the current and emitting the output light signal to the object, receiving an input light signal input after being reflected from the object, and generating a depth map of the object using the input light signal.

The information about the object may include at least one among a surface material of the object, an area of the object, and a shape of the object.

The controlling may include controlling a current smaller than a reference current to be applied to the light source when a horizontal length is greater than a vertical length of the object and controlling a current greater than the reference current to be applied to the light source when the vertical length is greater than the horizontal length of the object.

The generating of the depth map may include generating the depth map using a phase difference between the output light signal and the input light signal.

The controlling may include performing control so that a section in which a first current is applied to the light source and a section in which a second current greater than the first current is applied to the light source are alternately repeated.

Advantageous Effects

According to embodiments of the present invention, a depth map with high accuracy can be extracted in consideration of a surface material of an object. In addition, according to embodiments of the present invention, a depth map of a specific region within a field of view can be selectively extracted without a separate driving device.

DESCRIPTION OF DRAWINGS

FIG. 1 is a block diagram of a camera device according to an embodiment of the present invention.

FIG. 2 is a schematic cross-sectional view of the camera device according to the embodiment of the present invention.

FIG. 3 (*a*) to (*c*) show views for describing output light signals output by the camera device according to the embodiment of the present invention.

FIG. 4 is a block diagram of a camera device according to one embodiment of the present invention.

FIG. 5 is a flowchart of a method of generating a depth map of the camera device according to one embodiment of the present invention.

FIGS. 6 and 7 (*a*) and (*b*) are views for describing a polarization direction according to a current applied to a light source included in the camera device according to the embodiment of the present invention.

FIG. 8 (*a*) to (*d*) show views for describing pulse shapes according to a current applied to the light source included in the camera device according to the embodiment of the present invention.

FIG. 9 is a schematic cross-sectional view of a camera device according to another embodiment of the present invention.

FIG. 10 (*a*) to (*d*) show views showing pulses of output light signals controlled according to a current applied to a light source.

FIG. 11 (*a*) to (*c*) show depth images that differ according to a current applied to the light source.

MODES OF THE INVENTION

Hereinafter, exemplary embodiments of the present invention will be described in detail with reference the accompanying drawings.

However, the technical spirit of the present invention is not limited to some embodiments which will be described and may be implemented in a variety of different forms, and one or more components of the embodiments may be selectively combined, substituted, and used within the range of the technical spirit of the present invention.

In addition, unless clearly and specifically defined otherwise by the context, all terms (including technical and scientific terms) used herein can be interpreted as having meanings customarily understood by those skilled in the art, and the meanings of generally used terms, such as those defined in commonly used dictionaries, will be interpreted in consideration of contextual meanings of the related art.

In addition, the terms used in the embodiments of the present invention are considered in a descriptive sense only and not to limit the present invention.

In the present specification, unless specifically indicated otherwise by the context, singular forms include plural forms, and in a case in which "at least one (or one or more) among A, B, and C" is described, this may include at least one combination among all possible combinations of A, B, and C.

In addition, in descriptions of components of the present invention, terms such as "first," "second," "A," "B," "(a)," and "(b)" may be used.

The terms are only to distinguish one component from another component, and the essence, order, and the like of the components are not limited by the terms.

In addition, it should be understood that, when a first component is referred to as being "connected" or "coupled" to a second component, such a description may include both a case in which the first component is directly connected or coupled to the second component, and a case in which the first component is connected or coupled to the second component with a third component disposed therebetween.

In addition, when a first component is described as being formed or disposed "on" or "under" a second component, such a description includes both a case in which the two components are formed or disposed in direct contact with each other and a case in which one or more other components are interposed between the two components. In addition, when the first component is described as being formed "on or under" the second component, such a description may include a case in which the first component is formed at an upper side or a lower side with respect to the second component.

A camera device according to an embodiment of the present invention may be a camera which extracts a depth map using a time of flight (ToF) function. Accordingly, the camera device may be used interchangeably with a ToF camera device, a ToF camera module, a ToF camera, or the like.

FIG. 1 is a block diagram of a camera device according to an embodiment of the present invention, and FIG. 2 is a schematic cross-sectional view of the camera device according to the embodiment of the present invention. FIG. 3 shows views for describing output light signals output by the camera device according to the embodiment of the present invention.

Referring to FIGS. 1 and 2, a camera 1 according to the embodiment of the present invention includes a light output unit 10, a light receiving unit 20, a depth information generation unit 30, and a control unit 40.

The light output unit 10 generates an output light signal and then emits the output light signal to an object. In this case, the light output unit 10 may generate and output the output light signal in the form of a pulse wave or continuous wave. The continuous wave may have the form of a sinusoid wave or squared wave. By generating the output light signal in the form of the pulse wave or continuous wave, the camera 1 may detect a time difference or phase difference between the output light signal output from the light output unit 10 and an input light signal reflected from the object and then input to the light receiving unit 20. In the present specification, output light may be light output from the light output unit 10 and incident on the object, and input light may be light which is output from the light output unit 10, reaches the object, is reflected from the object, and then is input to the light receiving unit 20. From a viewpoint of the object, the output light may be incident light, and the input light may be reflected light.

Referring to FIG. 3A, the light output unit 10 may generate light pulses at constant periods. The light output unit 10 may generate the light pulses each having a predetermined pulse width tpulse in a predetermined pulse repetition period tmodulation.

Referring to FIG. 3B, a predetermined number of light pulses generated by the light output unit 10 may be grouped to form phase pulses. The light output unit 10 may generate the phase pulses each having a predetermined phase pulse period tphase and a predetermined phase pulse width texposure. The phase pulse width may be denoted as tillumination or tintegration. In this case, one phase pulse period tphase may correspond to one subframe. The subframe may be referred to as a phase frame. A predetermined number of phase pulse periods may be grouped. A method of grouping four phase pulse periods tphase may be referred to as a 4-phase method. A method of grouping eight phases tphase may be referred to as an 8-phase method.

Referring to FIG. 3C, a predetermined number of phase pulses generated by the light output unit 10 may be grouped to form one frame pulse. The light output unit 10 may generate the frame pulse having a predetermined frame pulse period tframe and a predetermined frame pulse width tphase group (subframe group). In this case, one frame pulse period tframe may correspond to one frame. Accordingly, when an image of an object is captured at 10 frames per second (FPS), one frame pulse period tframe may be repeated ten times within one second. In a 4-phase method, one frame may include four subframes. That is, one frame may be generated using four subframes. In an 8-phase method, one frame may include eight subframes. That is, one frame may be generated using eight subframes.

Terms such as "light pulse," "phase pulse," and "frame pulse" are used above for the description, but the present invention is not limited thereto.

Referring to FIGS. 1 and 2 again, the light output unit 10 may include a light source 100 and a lens assembly 110.

First, the light source 100 generates light. The light generated by the light source 100 may be infrared light having a wavelength of 770 to 3000 nm or may be visible light having a wavelength of 380 to 770 nm. A light emitting diode (LED) may be used as the light source 100, and the light source 100 may have a shape in which a plurality of LEDs are disposed according to a predetermined pattern. In addition, the light source 100 may include an organic LED (OLED) or laser diode (LD). Alternatively, the light source 100 may be a vertical cavity surface emitting laser (VCSEL). The VCSEL is a kind of LD which converts an electrical signal into a light signal and may output a wavelength of about 800 to 1000 nm, for example, about 850 nm or about 940 nm. The light source 100 generates an output light signal in the form of a pulse wave or continuous wave by repeatedly being turned on and off at predetermined time intervals. The time intervals may be a frequency of the output light signal.

The lens assembly 110 may collect light output from the light source 100 and output the collected light to the outside. The lens assembly 110 may be disposed above the light source 100 to be spaced apart from the light source 100. In this case, an upward direction from the light source 100 may be a direction in which light is output from the light source 100. The lens assembly 110 may include at least one lens. When the lens assembly 110 includes a plurality of lenses, the lenses may be aligned based on a central axis to form an optical system. In this case, the central axis may be the same as an optical axis of the optical system.

The lens assembly 110 may be accommodated in or supported by a housing 120. According to one embodiment, the housing 120 may be coupled to a driving module (not shown), and the lens assembly 110 may be moved by the driving module (not shown) in a direction of the optical axis or a direction perpendicular to the optical axis.

Meanwhile, the light receiving unit 20 receives reflected light from an object. To this end, the light receiving unit 20 may include a lens assembly 130 which collects input light reflected from the object, a filter (not shown), and an image sensor 140 which converts the input light passing through the lens assembly 130 into an electrical signal. The lens assembly 130, the filter (not shown), and the image sensor 140 may be accommodated in or supported by a housing 150. It is illustrated that the housing 120 at a side of the light output unit 10 and the housing 150 at a side of the light receiving unit 20 are spaced apart from each other, but the present invention is not limited thereto, and the housing 120 at the side of the light output unit 10 and the housing 150 at the side of the light receiving unit 20 may also be an integrated housing.

An optical axis of the lens assembly 130 may be aligned with an optical axis of the image sensor 140. The filter (not shown) may be disposed between the lens assembly 130 and the image sensor 140 and may filter light having a predetermined wavelength range. For example, the filter (not shown) may transmit light within a wavelength band of output light output by the light output unit 10.

The image sensor 140 may be synchronized with a turning-on-and-off period of the light source 100 to receive an input light signal. Specifically, the image sensor 140 may receive light at an in phase and an out phase of an output light signal output from the light source 100. That is, the image sensor 140 may repeat receiving the input light signal at a time when the light source is turned on and receiving the input light signal at a time when the light source is turned off. The image sensor 140 may generate an electrical signal corresponding to each reference signal using a plurality of reference signals having different phase differences. A frequency of the reference signal may be set to be the same as a frequency of an output light signal output from the light source 100. Accordingly, when the light source 100 generates output light signals having a plurality of frequencies, the image sensor 140 generates electrical signals using the plurality of reference signals corresponding to the frequencies. Each of the electrical signals may include information about an amount of charges or voltage corresponding to the reference signal.

According to the embodiment of the present invention, there may be four reference signals C1 to C4. The reference signals C1 to C4 may have the same frequency as an output light signal and have phase differences of 90 degrees from each other. One reference signal C1 among the four reference signals may have the same phase as the output light signal. A phase of an input light signal is delayed as much as a distance that the output light signal travels to be incident on an object, reflected by the object, and returned to the image sensor 140. The image sensor 140 mixes the input light signal and the reference signal. Then the image sensor 140 may generate an electrical signal for each reference signal.

The image sensor 140 may be formed with a structure in which a plurality of pixels are arranged in the form of a grid. The image sensor 140 may be a complementary metal oxide semiconductor (CMOS) image sensor or may be a charge coupled device (CCD) image sensor. In addition, the image sensor 140 may include a ToF sensor which receives infrared (IR) light reflected from an object to measure a distance using a time or phase difference. For example, each pixel may include an in-phase receiving unit which receives an input light signal at the same phase as a waveform of output light and an out-phase receiving unit which receives an input light signal at a phase opposite to a phase of the waveform of the output light. When the in-phase receiving unit and the out-phase receiving unit are activated at different times, a difference in an amount of received light between the in-phase receiving unit and the out-phase receiving unit occurs according to a distance from the object, and a distance from the object can be calculated using the difference.

The light receiving unit 20 may be disposed parallel to the light output unit 10. The light receiving unit 20 may be disposed beside the light output unit 10. The light receiving unit 20 may be disposed in the same direction as the light output unit 10.

The depth information generation unit 30 may generate a depth map of an object using an input light signal input to the light receiving unit 20. For example, the depth information generation unit 30 may generate a depth map of an object using a flight time for which an output light signal output from the light output unit 10 is reflected from the object and input to the light receiving unit 20. For example, the depth information generation unit 30 calculates a phase difference between an output light signal and an input light signal using electrical signals received from the image sensor 140, and calculates a distance between an object and the camera 1 using the phase differences.

Specifically, the depth information generation unit 30 may calculate the phase difference between the output light signal and the input light signal using charge information of the electrical signals.

As described above, four electrical signals may be generated for each frequency of an output light signal. Accordingly, the depth information generation unit 30 may calculate a phase difference td between the output light signal and the input light signal using the following Equation 1.

$$t_d = \arctan\left(\frac{Q_3 - Q_4}{Q_1 - Q_2}\right) \quad \text{[Equation 1]}$$

In this case, Q1 to Q4 are amounts of charges of four electrical signals. Q1 is the amount of charges of an electrical signal corresponding to a reference signal having the same phase as an output light signal. Q2 is the amount of charges of an electrical signal corresponding to a reference signal having a phase delayed by 180 degrees from that of the output light signal. Q3 is the amount of charges of an electrical signal corresponding to a reference signal having a phase delayed by 90 degrees from that of the output light signal. Q4 is the amount of charges of an electrical signal corresponding to a reference signal having a phase delayed by 270 degrees from that of the output light signal.

Then, the depth information generation unit 30 may calculate a distance between an object and the camera 1 using phase differences between the output light signal and the input light signals. In this case, the depth information generation unit 30 may calculate a distance d between the object and the camera 1 using the following Equation 2.

$$d = \frac{c}{2f}\frac{t_d}{2\pi} \quad \text{[Equation 2]}$$

In this case, c is the speed of light, and f is a frequency of output light.

The control unit 40 controls operations of the light output unit 10, the light receiving unit 20, and the depth information generation unit 30. Each of the depth information generation unit 30 and the control unit 40 may be implemented in the form of a printed circuit board (PCB). Alternatively, the control unit 40 may be included in a terminal in which the camera 1 according to the embodiment of the present invention is disposed. For example, the control unit 40 may be implemented in the form of an application processor (AP) of a smartphone equipped with the camera device 1 according to the embodiment of the present invention.

According to the embodiment of the present invention, an accuracy of a depth map can be improved by controlling a current applied to the light source 100.

Figure 8:
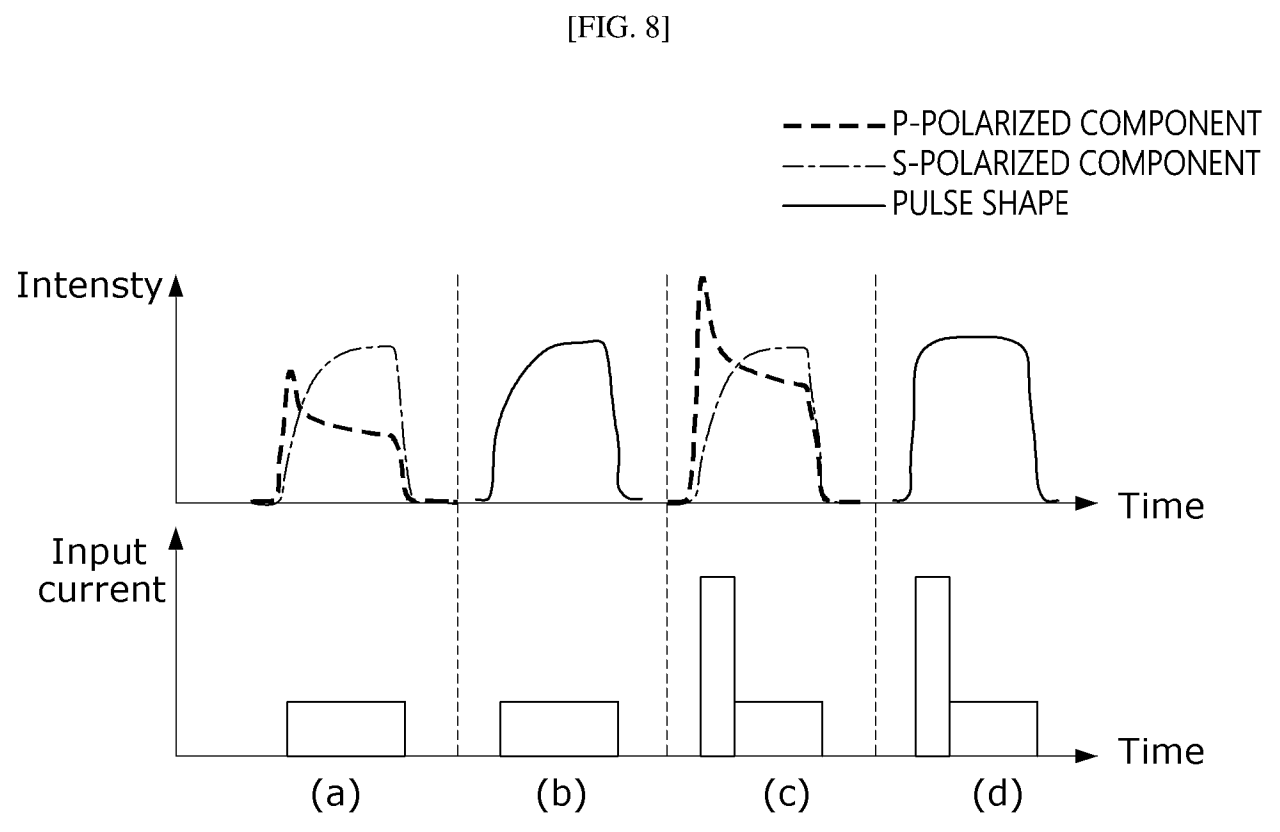

FIG. 4 is a block diagram of a camera device according to one embodiment of the present invention, and FIG. 5 is a flowchart of a method of generating a depth map of the camera device according to one embodiment of the present invention. FIGS. 6 and 7 are views for describing a polarization direction according to a current applied to a light source included in the camera device according to the embodiment of the present invention, and FIG. 8 shows views for describing pulse shapes according to a current applied to the light source included in the camera device according to the embodiment of the present invention.

Referring to FIG. 4, a camera device 1 includes a light output unit 10, a light receiving unit 20, a depth information generation unit 30, and a control unit 40. Duplicated descriptions the same as those of the light output unit 10, the light receiving unit 20, the depth information generation unit 30, and the control unit 40 described with reference to FIGS. 1 to 3 will be omitted.

Referring to FIGS. 6 to 8, a light source 100 included in the camera device according to the embodiment of the present invention may be a light source of which a polarization direction and a pulse shape change according to an intensity of an applied current. In this case, the pulse shape may be used interchangeably with a waveform. According to the embodiment of the present invention, the light source 100 may be an edge-emitting laser (EEL) or VCSEL.

As illustrated in FIG. 6, an amount of a P-polarized component and an amount of an S-polarized component included in an output light signal output by the light source 100 may change according to an intensity of a current applied to the light source 100. For example, as illustrated in FIG. 7A, an amount of a P-polarized component greater than an amount of an S-polarized component is output at a DC current smaller than a reference DC current ref, and as illustrated in FIG. 7B, an amount of an S-polarized component greater than an amount of a P-polarized component may be output at a DC current greater than the reference DC current.

As illustrated in FIG. 8A, a P-polarized component may have a rising edge of a higher intensity than that of an S-polarized component. Light output from the light source 100 may pass through a lens assembly 110 and may be output to have a pulse shape illustrated in FIG. 8B. According to an intensity of a current applied to the light source 100, an amount of a P-polarized component and an amount of an S-polarized component may be variously combined, and a width, a height, and a uniformity of a pulse may change according to the combination of the P-polarized component and the S-polarized component.

In particular, as illustrated in FIG. 8C, when an additional current is applied to the light source 100 instantaneously, a rising edge of a pulse may be more clearly visible as illustrated in FIG. 8D.

According to the embodiment of the present invention, the light source 100 generates an output light signal according to a current controlled by the control unit 40. In this case, the control unit 40 may control a current applied to the light source 100 on the basis of information about an object. To this end, the camera device 1 according to the embodiment of the present invention may further include an object information acquisition unit 50 which acquires information about the object.

Referring to FIGS. 4 and 5 again, the object information acquisition unit 50 of the camera device 1 according to the embodiment of the present invention acquires information about the object (S500). In this case, the information about the object may include at least one among a surface material of the object, an area of the object, and a shape of the object. In this case, the object information acquisition unit 50 may acquire the information about the object from a sensor (not shown) disposed inside or outside the camera device 1. Alternatively, the object information acquisition unit 50 may acquire the information about the object through a user interface (not shown).

Then, the control unit 40 controls a current applied to the light source 100 on the basis of the information about the object acquired by the object information acquisition unit 50 (S510), and the light source 100 generates an output light signal on the basis of the applied current and emits the output light signal to the object (S520). In addition, the light receiving unit 20 receives an input light signal reflected from the object and then input to the light receiving unit 20 (S530), and the depth information generation unit 30 generates a depth map of the object using the input light signal (S540).

For example, a reflectivity of light on a surface of the object may change according to the surface material of the object. That is, when the surface material of the object is a metal, a polarization direction of the light incident on the object and a polarization direction of the light reflected from the object may be the same. Alternatively, a polarization direction of the light incident on the object may be different from a polarization direction of the light reflected from the object according to a surface material of the object. According to the embodiment of the present invention, when a polarized component incident on the object and a polarized component reflected from the object are controlled for each surface material of the object, and only the reflected polarized component is detected, detection accuracy for a specific surface material can be improved. For example, when a depth map of a metal material in a field of view of the camera device 1 is to be acquired, the light source 100 can be controlled to output only a P-polarized component (or S-polarized component), and when only the P-polarized component (or S-polarized component) reflected from the object is to be detected, only a depth map of the metal material can be detected with high accuracy.

As another example, referring to FIG. 7A, when a depth map of an object of which a horizontal length of an object is greater than a vertical length or a region of which a length in a horizontal direction is greater than a length in a vertical direction is to be acquired, the control unit 40 may control a current applied to the light source 100 to output a P-polarized component which has a greater amount than an S-polarized component. That is, the control unit 40 may control a current smaller than a reference current to be applied to the light source 100. In this case, the reference current may change according to the light source 100 and may be an intrinsic characteristic of the light source 100.

As still another example, referring to FIG. 7B, when a depth map of an object of which a vertical length is greater than a horizontal length or a region of which a length in the vertical direction is greater than a length in the horizontal direction is to be acquired, the control unit 40 may control a current to output an S-polarized component which has a greater amount than a P-polarized component. That is, the control unit 40 may control a current greater than a reference current to be applied to the light source 100. In this case, the reference current may change according to the light source 100 and may be an intrinsic characteristic of the light source 100.

FIG. 9 is a schematic cross-sectional view of a camera device according to another embodiment of the present invention. Duplicated descriptions for the same content described with reference to FIGS. 1 to 8 will be omitted.

Referring to FIG. 9, a light receiving unit 20 may further include a polarization member 160 which selectively transmits an input light signal having a predetermined polarization angle of the input light signal. In this case, the polarization member 160 may be a polarizer or a phase delayer. Accordingly, an image sensor 140 may receive only the input light signal passing through the polarization member 160 at the predetermined polarization angle.

As described above, a reflectivity of light on a surface of an object may change according to a surface material of the object. That is, when the surface material of the object is a metal or water, a polarization direction of light incident on the object and a polarization direction of light reflected from the object may be the same. Alternatively, according to a surface material of an object, a polarization direction of light incident on an object may be different from a polarization direction of light reflected from the object. According to the embodiment of the present invention, when a polarized component incident on an object and a polarized component reflected from the object are controlled for each surface material of the object and only the reflected polarized component is detected, detection accuracy for a specific surface material can be improved. For example, when a depth map of a metal material within a field of view of a camera device 1 is to be acquired, the light source 100 may be controlled to output only a P-polarized component (or S-polarized component), and only a P-polarized component (or S-polarized component) which is reflected from an object and then passes through the polarization member 160 may be detected to detect only the depth map of the metal material with high accuracy. Alternatively, when only a depth map of a material excluding a metal material in the field of view of the camera device 1 is to be acquired, the light source 100 may be controlled to output only a P-polarized component (or S-polarized component), and only an S-polarized component (or P-polarized component) which is reflected from an object and passes through the polarization member 160 may be detected to detect the depth map of the material excluding the metal material with high accuracy.

Hereinafter, various examples of controlling an output waveform of a light source 100 will be described according to an embodiment of the present invention.

FIG. 10 shows views showing pulses of output light signals controlled according to a current applied to a light source, and FIG. 11 shows depth images that differ according to a current applied to the light source.

Referring to FIGS. 10A to 10D, when a predetermined number of phase pulses, for example, four phase pulses, form one frame pulse (1 fps), and a predetermined number of light pulses form one phase pulse, a control unit 40 included in a camera device 1 according to the embodiment of the present invention may control a current of the light pulse.

For example, an applied DC current in an example of FIG. 10A may be greater than that in an example of FIG. 10B. Accordingly, an input current for a light pulse according to the example of FIG. 10A may be greater than an input current for a light pulse according to the example of FIG.

10B. Accordingly, an output light output from a light source according to the example of FIG. 10A may include an S-polarized component which has a greater amount than an S-polarized component output from the light source according to the example of FIG. 10B. In addition, an input current for a light pulse according to the example of FIG. 10B may be greater than an input current for a light pulse according to the example of FIG. 10A. Accordingly, output light output from the light source according to the example of FIG. 10B may include a P-polarized component which has a greater amount than a P-polarized component of output light output from the light source according to the example of FIG. 10A. As a result, for an image of an object of FIG. 11A, a vertical length of a depth image (see FIG. 11B) acquired using the light pulse according to the example of FIG. 10A is greater than that of a depth image (see FIG. 11C) acquired using the light pulse according to the example of FIG. 10B. In addition, a horizontal length of the depth image (see FIG. 11C) acquired using the light pulse according to the example of FIG. 10B may be greater than that of the depth image (see FIG. 11B) acquired using the light pulse according to the example of FIG. 10A.

Meanwhile, as illustrated in FIG. 10C, a current applied to a light source 100 may change even within one phase pulse. For example, when an input current for an initial light pulse within one phase pulse is greater than an input current for each of the remaining light pulses, a phase pulse may have a clear rising edge as illustrated in FIGS. 8C and 8D, and thus an accuracy of a depth map can be improved.

Alternatively, as illustrated in FIG. 10D, a current applied to the light source 100 may change for each frame. For example, an input current for a light pulse for an odd frame may be greater than an input current for a light pulse for an even frame. Accordingly, in the odd frame, a depth image of which a vertical length extends may be acquired, and in the even frame, a depth image of which a horizontal length extends may be acquired. When the odd frame and the even frame are combined, a depth image of which both the vertical length and the horizontal length extend can be acquired, and in a region in which the odd frame and the even frame overlap, a depth image with a much higher accuracy can be acquired.

While the present invention has been mainly described above with reference to the embodiments, it will be understood by those skilled in the art that the present invention is not limited to the embodiments, the embodiments are only exemplary, and various modifications and applications, which are not exemplified above, may be made within the range of the present invention without departing from the essential features of the present embodiments. For example, components specifically described in the embodiments may be implemented with modifications. In addition, it should be interpreted that differences related to such modifications and applications fall within the scope of the present invention defined by the appended claims.

REFERENCE NUMERALS

1: CAMERA DEVICE
10: LIGHT OUTPUT UNIT
20: LIGHT RECEIVING UNIT
30: DEPTH INFORMATION GENERATION UNIT
40: CONTROL UNIT
50: OBJECT INFORMATION ACQUISITION UNIT
100: LIGHT SOURCE

The invention claimed is:

1. A camera device comprising:
a light emitter which generates an output light signal and emits the output light signal to an object;
a light receiver which receives an input light signal which is reflected from the object and then input to the light receiver;
a depth information generator which generates a depth map of the object using the input light signal input to the light receiving; and
a controller which controls the light emitter, the light receiver, and the depth information generator,
wherein the light emitter includes a light source for generating the output light signal,
wherein the controller controls an intensity of a current applied to the light source on the basis of information about the object,
wherein the information about the object includes a shape of the object,
wherein the controller controls a current smaller than a reference current to be applied to the light source when a horizontal length of the object is greater than a vertical length of the object, and
wherein the controller controls a current greater than the reference current to be applied to the light source when the vertical length of the object is greater than the horizontal length of the object.

2. The camera device of claim 1, wherein the information about the object includes at least one a surface material of the object, and an area of the object.

3. The camera device of claim 2, wherein:
the controller controls the light source to output only P-polarized component and detects only P-polarized component reflected from the object when a surface material of the object is metal.

4. The camera device of claim 2, wherein:
the controller controls the light source to output only S-polarized component and detects only S-polarized component reflected from the object when a surface material of the object is metal.

5. The camera device of claim 2, wherein:
the controller controls the light source to output only S-polarized component and detects only P-polarized component reflected from the object when a surface material of the object is not metal.

6. The camera device of claim 2, wherein:
the controller controls the light source to output only P-polarized component and detects only S-polarized component reflected from the object when a surface material of the object is not metal.

7. The camera device of claim 1, wherein the light emitter further includes a lens assembly for diffusing the output light signal output from the light source.

8. The camera device of claim 1, wherein the light receiver includes:
a polarizer for selectively transmitting an input light signal having a predetermined polarization angle of the input light signal; and
an image sensor for receiving the input light signal passing through the polarizer.

9. The camera device of claim 1, wherein at least one of a polarization characteristic and a waveform of the output light signal output by the light source is changed according to the intensity of the current.

10. The camera device of claim 1, wherein the light source includes a vertical cavity surface emitting laser (VCSEL).

11. The camera device of claim 1, wherein the depth information generator generates a depth map using a phase difference between the output light signal and the input light signal.

12. The camera device of claim 1, wherein the controller controls so that a section in which a first current is applied to the light source and a section in which a second current greater than the first current is applied to the light source are alternately repeated.

13. The camera device of claim 1, wherein amounts of P polarized component and S polarized component of the output light signal output from the light source varies depending on the intensity of the current.

14. The camera device of claim 1, wherein the polarizer is a polarizer or a phase delayer.

15. A method of generating a depth map of a camera device, the method comprising:

acquiring information about an object;

controlling a current applied to a light source on the basis of the information;

generating an output light signal on the basis of the current and emitting the output light signal to the object;

receiving an input light signal input after being reflected from the object; and generating a depth map of the object using the input light signal, wherein the information about the object includes a shape of the object, and wherein the controlling includes: controlling a current smaller than a reference current to be applied to the light source when a horizontal length is greater than a vertical length of the object; and controlling a current greater than the reference current to be applied to the light source when the vertical length is greater than the horizontal length of the object.

16. The method of claim 15, wherein the information about the object further includes at least one a surface material of the object and an area of the object.

17. The method of claim 16, wherein: the camera device controls the light source to output only P-polarized component and detects only P-polarized component reflected from the object when a surface material of the object is metal.

18. The method of claim 15, wherein the generating of the depth map includes generating the depth map using a phase difference between the output light signal and the input light signal.

19. The method of claim 15, wherein the controlling includes performing control so that a section in which a first current is applied to the light source and a section in which a second current greater than the first current is applied to the light source are alternately repeated.

20. A camera device comprising:

a light emitter which generates an output light signal and emits the output light signal to an object;

a light receiver which receives an input light signal which is reflected from the object and then input to the light receiver;

a depth information generator which generates a depth map of the object using the input light signal input to the light receiver; and a controller which controls the light emitter, the light receiver, and the depth information generator, wherein the emitter unit includes a light source for generating the output light signal, wherein the controller controls an intensity of a current applied to the light source on the basis of information about the object, and wherein the controller controls so that a section in which a first current is applied to the light source and a section in which a second current greater than the first current is applied to the light source are alternately repeated.

* * * * *